Patented Jan. 26, 1954

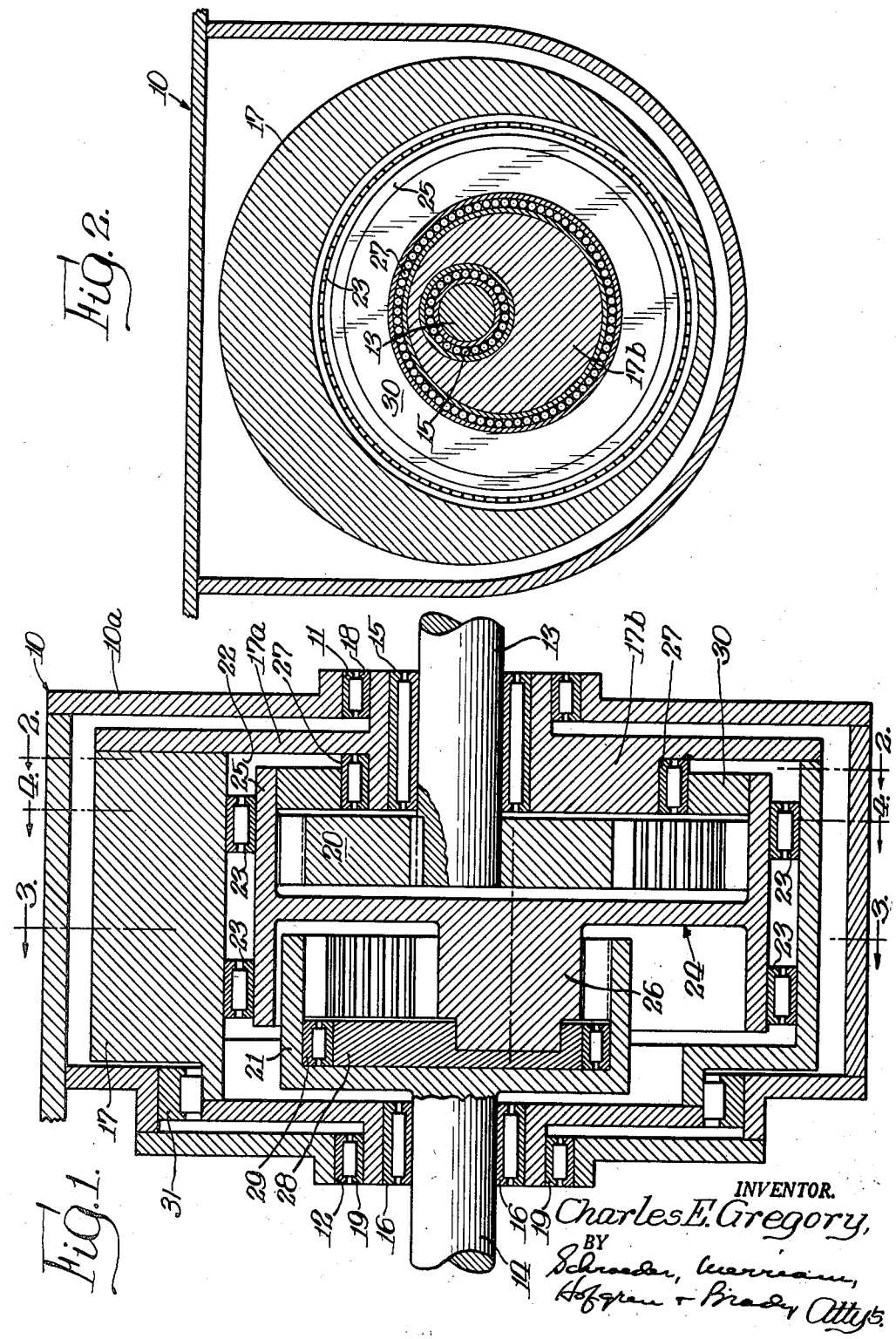

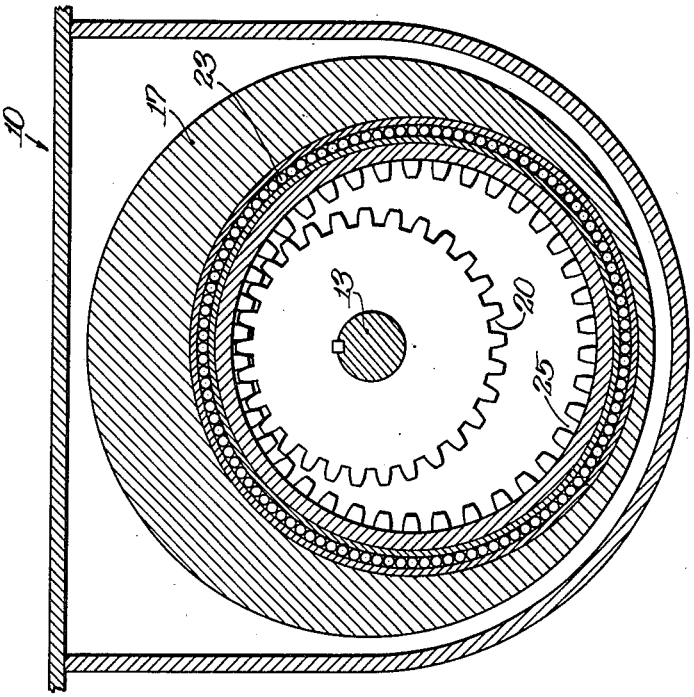
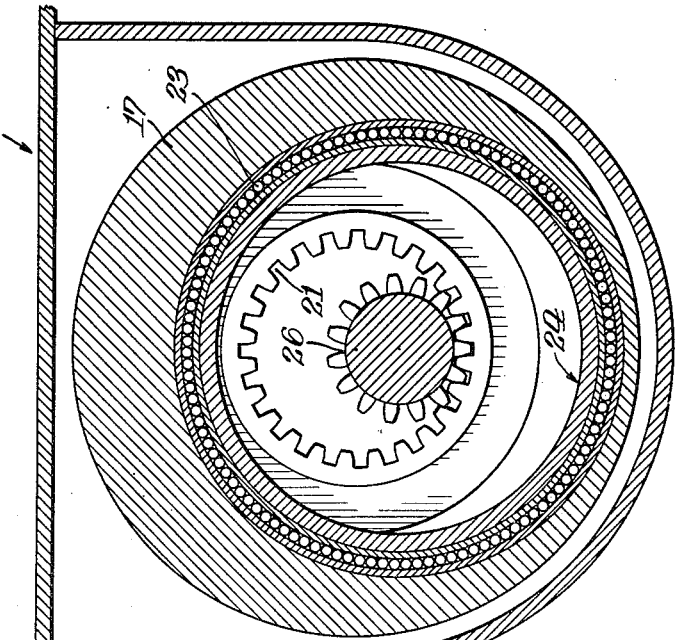

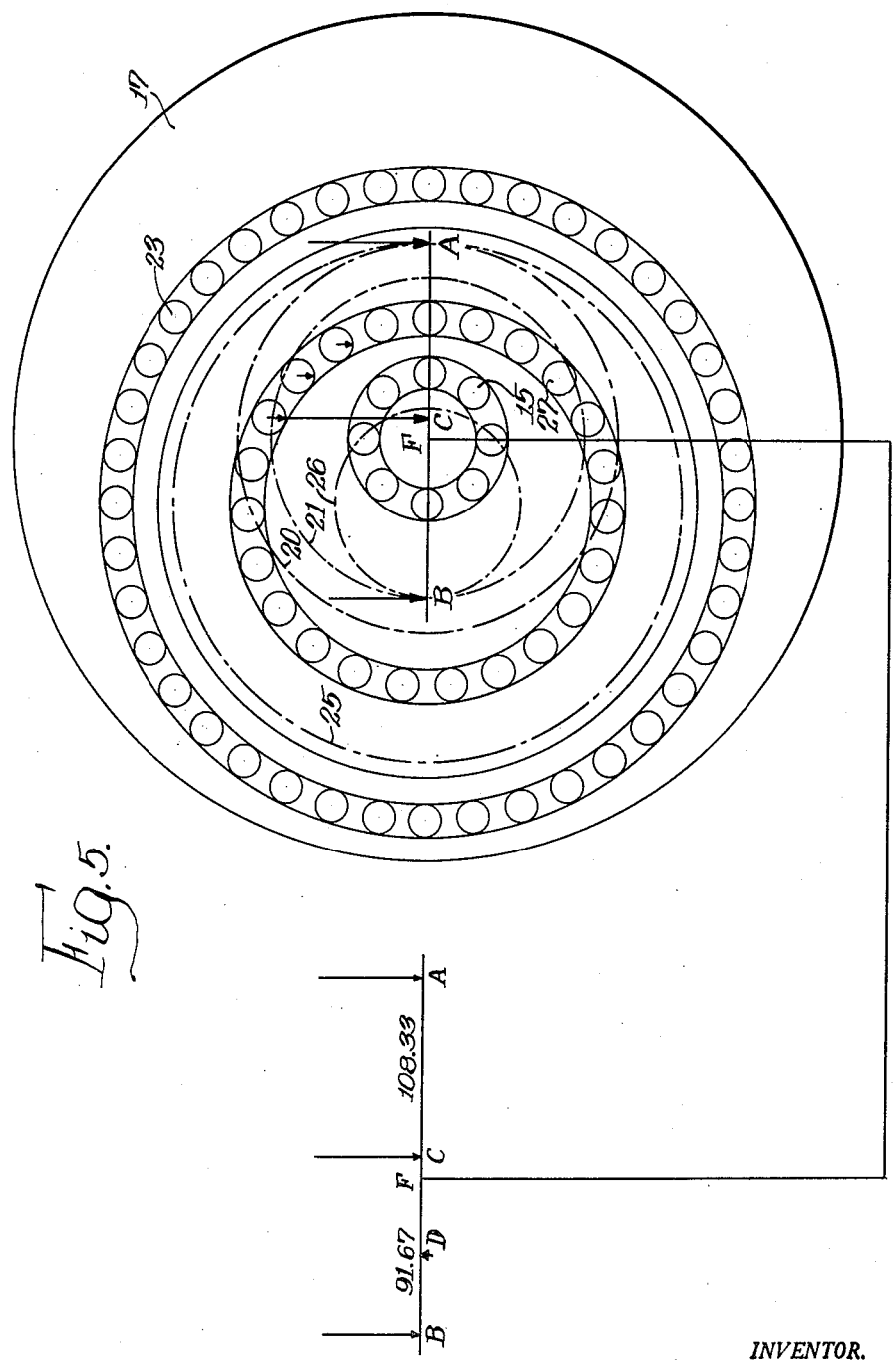

2,667,089

UNITED STATES PATENT OFFICE 2,667,089

DIRECT DRIVE TRANSMISSION WITH AUTO-
MATICALLY LOAD RESPONSIVE RANGE
OF LOW GEAR RATIOS

Charles E. Gregory, Chicago, Ill.

Application July 8, 1950, Serial No. 172,722

3 Claims. (Cl. 74—751)

This invention relates to a power transmission mechanism, and in particular it relates to a direct drive transmission which has an automatically load responsive range of low gear ratios. The device may be employed either as a torque amplifying transmission, or as a differential gear.

Many attempts have been made to provide a transmission which will normally afford a direct drive, and which will automatically drop to a low gear ratio in response to changes in torque. The majority of such attempts have centered around planetary gear systems, which inherently provide an infinite and continuous range of gear ratios between a predetermined "low" ratio and direct drive. But, as is well known, the planetary must be locked both in low gear and in high gear by the use of bands, brakes, clutches or the like, and if a transmission is to perform automatically throughout the selected range of gear ratios the bands must be subject to automatic controls which respond to variations in torque. Such controls are ordinarily quite complex and expensive.

The usual planetary system tends to remain out of direct drive—that is, if it is a speed multiplying unit the gears tend to drive the carrier forward, while if it is a speed-reducing unit the gears tend to drive the carrier backward; so that in either case a brake is necessary to lock the unit in 1 to 1 ratio.

I have discovered that a transmission may be constructed which normally functions as a direct drive, without the necessity of any bands or clutches to retain it in direct drive, and which automatically drops out of direct drive only when output torque exceeds input torque. My unit is so constructed that it tends to go out of a gear ratio and into direct drive whenever input torque times gear ratio exceeds output torque by a sufficient amount to start the carirer moving forward; and tends to stay in direct drive as long as output torque does not exceed input torque, disregarding frictional losses. Once out of direct drive, and with an increasing excess of output torque over input torque, it passes automatically through an infinite and continuous range of gear ratios down to a predetermined "low" gear ratio, in response solely to variations between input torque and output demand, or load. The unit is of particular value in applications such as compressors without unloading devices, and lifts or hoists where the torque required to start is far higher than that needed to keep the equipment running. The unit can start in its lowest gear ratio; and once starting inertia is overcome so as to reduce output torque to the point where it exceeds input torque by only 8.3% the carrier begins rotating and the unit starts through its continuous range of gear ratios toward 1 to 1. When input torque and output torque are equal the unit will be in direct drive, and will stay there as long as there is no excess of load over input.

The transmission is generally of the planetary type; but as is plain from the preceding paragraph, its performance is utterly unlike that of any conventional planetary transmission.

The improved transmission employs a drive shaft and an output shaft which are coaxial, and a rotatable gear carrier which is also coaxial with said shafts and surrounds them. The carrier has an eccentrically disposed gear receiving cavity, and a compound gear, which connects the drive gear on the drive shaft to the driven gear on the output shaft, rotates anti-frictionally in said cavity on the axis of the center of the cavity. The carrier, together with the compound gear which rotates on the axis of the gear cavity, function rather like a planetary system, in that they pass through an infinite and continuous range of gear ratios between direct drive and a predetermined low, depending upon the relative rates of rotation of the carrier, drive shaft and output shaft. The compound gear, of course, meshes with the drive gear on one side of its center and with the driven gear on the opposite side.

The relative dimensions of the drive gear and the output gear determine whether or not the system will tend to go into direct drive. If the drive gear is larger than the driven gear, the gear reduction in "low gear" is not quite as great as it would be if those gears were the same size. For example, if, as in the device shown in the drawing, the connecting gears would ordinarily provide a "low" ratio of 2.66 to 1, if the drive gear contains 30 teeth to 25 on the driven gear the "low" ratio will be 20 to 9, or 2.22 to 1.

The difference in size of the drive and driven gears provides a lever arm which is effective to maintain a clockwise pressure greater than the counterclockwise pressure of the load. This lever arm, then, provides the necessary clockwise pressure on the gear carrier tending to keep it rotating at the same rate as the shafts, so as to urge the entire mechanism toward direct drive.

In the particular transmission illustrated in the drawings, the radius of the drive gear is 1½ inches and that of the driven gear is 1¼ inches. When the transmission is operating as a direct drive, therefore, the point of mesh of the drive gear with the compound gear and the point of mesh of the driven gear with the compound gear are separated by a radial distance of 2¾ inches, and the center between said points is 1⅜ inches from each point, or ⅛ inch clockwise of the common axis of the two shafts. This is the effective point of application of pressure through the gears to the carrier; and the effective lever arm tending to move the carrier with the gears so as to urge the unit toward direct drive, is, therefore, ⅛ inch, or 8.3%. The unit has a range of load to input over which it passes through its continuous range of gear ratios between 2.22 to 1 and 1 to 1. Having started in its lowest gear ratio with the motor starting from rest, there is a steady increase of input torque as the motor increases its speed, and a decrease in inertia on the output shaft as the load speeds up. The unit remains in 2.22 to 1 ratio until load torque exceeds input torque by only 8.3%, at which point the 8.3% force advantage takes the unit out of the lowest gear ratio. As the differential between input torque and load diminishes, the gear ratio automatically becomes less and less; and the carrier increases speed until at equal input torque and output torque the unit is in 1 to 1 drive. With the carrier rotating at input gear speed and the unit driving in 1 to 1, with a slight increase of load over input torque the unit drops out of direct drive and the carrier slows down gradually, and stops when load exceeds input torque by more than 8.33%. Throughout this range there is, in effect, a sliding of the effective point of application of pressure on the lever arm from a point which results in a distinct clockwise pressure on the carrier, to an equilibrium point when the carrier and the shafts rotate as a unit. This point is reached when the point of application of pressure on the lever arm coincides with the axis of the coaxial shafts, and once this point is reached, there is no longer a lever arm and the unit rotates in 1 to 1.

With increase in load, input torque remaining constant, the carrier travels more and more slowly, thus bringing the transmission through an infinite and continuous range of gear ratios down to the "low" ratio, which in the device shown in the drawings is 20 to 9. Finally a balance point is reached, when the carrier stops rotating and stands still. This balance condition may be maintained as long as the relationship between input torque and load does not vary.

With further increase in load the carrier will rotate counterclockwise unless some means, such as a one-way brake, is employed to lock the carrier against counterclockwise rotation. A one-way brake prevents counterclockwise rotation of the carrier while affording minimum interference with clockwise rotation.

Without the brake, the mechanism acts as a differential; and a pair of them may be employed in the rear end of a motor vehicle in place of the conventional differential, in order to give positive drive to each of the rear wheels. With the brake, the mechanism is a simple and completely automatic torque responsive transmission.

It is plain that substantially any desired range of gear ratios may be employed; and that the tolerable percentage difference between input torque and load may be varied by using input and output gears of various radii. If the two gears are the same radius the device will have no tendency either to stay in direct drive or to go out of it. On the other hand, if the input gear were smaller than the output gear the tendency of the unit would be to go to its lower gear ratio, like a conventional planetary unit.

From the foregoing description it is clear that the principal object of the invention is to provide a simple, inexpensive direct drive transmission with an automatically load responsive range of low gear ratios.

Another object is to provide such a device which may be used in conjunction with a one-way brake to provide a transmission device, or without the brake to provide a differential gear.

Other objects will become readily apparent from the following detailed description taken in connection with the accompanying drawings illustrating a preferred form of the invention, wherein:

Fig. 1 is a vertical sectional view of a transmission embodying the invention;

Fig. 2 is a section taken as indicated along the line 2—2 of Fig. 1;

Fig. 3 is a section taken as indicated along the line 3—3 of Fig. 1;

Fig. 4 is a section taken as indicated along the line 4—4 of Fig. 1;

Fig. 5 is a diagrammatic view showing the application of force on the carrier when the transmission is in direct drive.

While the invention is susceptible of embodiment in various forms, there is shown in the drawings and herein described in detail a preferred form with the understanding that it is to be considered as an exemplification of the principles of the invention. The scope of the invention will be pointed out in the appended claims.

The device comprises a housing, indicated generally at 10 having an input shaft opening 11 and output shaft opening 12. An input or drive shaft 13 projects through the opening 11, and an output or drive shaft 14 extends through the opening 12, said shafts being coaxial. Needle bearings 15 and 16 surround the input shaft and the output shaft respectively, and serve to journal said shafts within appropriate aligned openings in a carrier 17; the carrier 17 itself being journalled, in turn, in bearings 18 and 19 in the openings 11 and 12, respectively. Thus the carrier and shafts are all coaxial.

A spur gear 20 is keyed on the inner end of the drive shaft 13, and an internally toothed gear 21 is keyed on the inner end of the output shaft 14. In the embodiment shown the spur gear 20 has 30 teeth and the internally toothed gear 21 has 25 teeth and it is this difference in radius, or number of teeth, of the gears which produces the lever arm heretofore mentioned.

The carrier 17 has a large gear carrying cavity 22, the axis of the cavity being eccentric with respect to the axis of the carrier; and within the cavity 22 are roller bearings 23 which rotatably support a compound gear, indicated generally at 24. The compound gear includes a ring gear 25 which meshes with the drive gear 20, and an integral pinion 26 which meshes with the output internally toothed gear 21. In the embodiment shown, the ring gear 25 has 40 teeth and the pinion 26 has 15 teeth.

The carrier 17 has a face plate 17a which includes a filler block 17b to furnish a supporting surface for roller bearings 27 which provide auxiliary support for the compound gear 24 through a filler ring 30. The pinion 26 of the compound gear 24 is supported by a filler ring 28 which is journalled in roller bearings 29 within a smooth surface of the internally toothed output gear 21. In order to limit rotation of the carrier 17 to a single direction, a one-way brake 30 is provided between the carrier 17 and the housing 10.

It is clear from the foregoing description that the transmission device may drive as a unit, with the drive shaft 13 and drive gear 20, carrier 17, compound gear 24, output gear 21 and output shaft 14 all rotating at the same speed so that there is no relative motion of the compound gear 24 and the gears 20 and 21. It is then in direct drive, a 1 to 1 gear ratio. On the other hand, it is also possible for the carrier 17 to stand still, in which case the drive is from the spur gear 20, through the ring gear 25 and pinion 26 of the compound gear 24, to the internally toothed gear 21. In this event the transmission operates as an ordinary train of gears; and with the gears shown in the drawings, i. e. 30 teeth, to 40 teeth, to 15 teeth, to 25 teeth, the gear ratio is 20 to 9. The difference in size, and consequently in number of teeth, between the gear 20 and the gear 21 changes what would otherwise be a 2.66 to 1 ratio to a 20 to 9, or 2.22 to 1.

The offset position of the compound gear 24 with respect to the axis of rotation of the carrier 17 causes it to exert a thrust on the carrier through the bearings 23, and due to the stepdown gearing the tendency is to drive the carrier counter-clockwise when resistance at the output shaft 14 is high. It is then that the one-way brake 31 operates to prevent counterclockwise rotation of the carrier 17 which affords a reaction member to provide the multiplication of torque which is present in the "low" gear ratio. Referring to the force diagram of Fig. 5, the center of the compound gear 24 is indicated by the letter D, and this center is substantially to the left of the center F of the shafts 13 and 14 and the carrier 17. The point of mesh between drive gear 20 and ring gear 25 is A, while the point of mesh between pinion 26 and output gear 21 is B. The distance between them represents a lever L having its fulcrum at F, the axis of the shafts 13 and 14. The midpoint between A and B is the effective point of application of force to the carrier 17 when the conditions are such that input torque times gear ratio equals (or exceeds) output torque. This point is somewhat to the right of F—that is on the opposite side from the axis D of the compound gear. This is due to the difference in radius of the gears 20 and 21; and it is to be noted that if the relative radii of these gears were reversed (making 20 smaller than 21) the midpoint C would fall on the same side as D. Due to the position of the point C, there is a force which urges the carrier forward and tends to move the unit into direct drive. Insofar as I am aware, all previous planetary units of this general type have had their points corresponding to the points C and D of this unit at the same side of the center F of the drive shaft, so have had a cumulative tendency to drive the carrier in one direction only.

Since the point C is to the right of F, at equilibrium conditions there is a constant tendency to drive the carrier clockwise with the gears; and regarding the distance from C to A and from C to B each as 100, the distance from F to A is 108.33 and that from F to B is 91.66, so that the effective force advantage tending to rotate the carrier clockwise is 8.33%. Thus, as long as load torque does not exceed input torque by more than that amount, the 8.33% force advantage tends to drive the carrier forward into direct drive. This advantage diminishes as the carrier picks up speed, until at 1 to 1 with no gear ratio the force is all being exerted directly through the axis F of the shafts. While any excess of output torque over input torque in direct drive will set up a gear ratio, there is an immediate establishment of a small lever arm tending to return the carrier to its direct drive relationship, so that when input again slightly exceeds output the unit returns to 1 to 1 drive. If load increases steadily, or input decreases steadily, the carrier passes gradually through the entire range of gear ratios until load exceeds input by 8.33%, at which point the unit will be in its low ratio of 2.22 to 1, there being a gradual shifting of the point of application of force on the carrier from C to F as this occurs. When force is again at F, the 8.33% inherent tendency of the unit to revert to 1 to 1 drive is overcome, and at that point the one-way brake 31 must come into play to lock the carrier 17 to the housing and prevent reverse rotation of the carrier.

If no one-way brake is employed, the carrier will rotate counterclockwise and the transmission thus may operate as a differential.

The small arrows on the ball bearings 27 in Fig. 5 show the application of force on the carrier through the filler block 28.

For convenience in assembly and servicing, the housing is preferably formed with a separate cover plate 10a which may be removed to give access to the carrier; and the face plate 17a of the carrier is also removable to give access to the gears inside the carrier.

I claim:

1. A direct drive transmission with an automatically load responsive range of low gear ratios, comprising: an input shaft provided with an integral spur gear; an output shaft coaxial with said input shaft and having an integral ring gear which is substantially smaller than said spur gear; a rotatable gear carrier surrounding said spur gear and ring gear and coaxial therewith, said gear carrier having a circular gear carrying cavity which has its center eccentric with respect to the aforesaid axis; and a compound gear freely rotatable in said gear carrying cavity, said compound gear having a ring gear portion which meshes with the spur gear on the input shaft and a spur gear portion which meshes with the ring gear on the output shaft, and said portions being so proportioned as to provide a gear reduction between said spur gear and said ring gear except in direct drive.

2. A direct drive transmission with an automatically load responsive range of low gear ratios, comprising: an input shaft provided with an integral drive gear; an output shaft coaxial with said input shaft and having an integral driven gear which is substantially smaller than said drive gear; a rotatable gear carrier surrounding said drive and driven gears and coaxial therewith, said gear carrier having a circular gear carrying cavity which has its center eccentric with respect to the aforesaid axis; a compound gear freely rotatable in said gear carrying cavity, said compound gear having a first portion which meshes with the drive gear and a second portion which meshes with the driven gear, and said portions being so proportioned as to provide a gear reduction between said drive gear and said driven gear except in direct drive; and means for limiting the direction of rotation of the gear carrier to that of the shaft.

3. A direct drive transmission according to claim 2 wherein a housing surrounds the gear carrier, and the means for limiting the direction of rotation of the gear carrier comprises a one way brake interposed between the carrier and the housing.

CHARLES E. GREGORY.

References Cited in the file of this patent

UNITED STATES PATENTS

| Number | Name | Date |
|---|---|---|
| 1,192,777 | Fisher | July 25, 1916 |
| 1,620,859 | Ahlm | Mar. 15, 1927 |
| 1,664,870 | Wells | Apr. 3, 1928 |
| 1,715,908 | Du Pont | June 4, 1929 |
| 1,717,681 | Goodwin | June 18, 1929 |
| 1,740,010 | Engehardt | Dec. 17, 1029 |
| 2,181,162 | Zaenger | Nov. 28, 1939 |
| 2,285,760 | Thompson | June 9, 1942 |
| 2,595,628 | Baule | May 6, 1952 |